United States Patent [19]
Schoen et al.

[11] Patent Number: 5,358,302
[45] Date of Patent: Oct. 25, 1994

[54] RETAINING ARRANGEMENT FOR FENDER

[75] Inventors: Robert M. Schoen, West Bloomfield; Peter D. Greb, Farmington Hills; Rickie A. North, Fenton, all of Mich.

[73] Assignee: Chrysler Corporation, Highland Park, Mich.

[21] Appl. No.: 112,020

[22] Filed: Aug. 26, 1993

[51] Int. Cl.⁵ ............................................. B62D 25/16
[52] U.S. Cl. .................... 296/187; 296/191; 296/198; 52/573.1; 52/582.1
[58] Field of Search ............... 296/29, 187, 191, 198, 296/901; 52/573.1, 582.1

[56] References Cited

U.S. PATENT DOCUMENTS

| | | | |
|---|---|---|---|
| 4,573,733 | 3/1986 | Zaydel | 296/191 |
| 4,973,102 | 11/1990 | Bign | 296/187 |
| 5,061,108 | 10/1991 | Bign | 403/24 |
| 5,098,765 | 3/1992 | Bign | 296/191 X |
| 5,297,845 | 3/1994 | Smartt et al. | 296/191 |

Primary Examiner—Dennis H. Pedder
Attorney, Agent, or Firm—Edward P. Barthel

[57] ABSTRACT

A clip and bracket retainer arrangement for attaching a plastic panel to the subjacent frame of an automotive vehicle enabling controlled distortion free thermal expansion and contraction of the plastic panel relative to the frame. The attaching arrangement includes a retaining clip fixed on an outboard surface of a panel support wall and an L-sectioned bracket comprising a vertical head plate and a horizontal base plate mounted to the frame. The retaining clip, having a U-shape in horizontal cross section, comprises an elongated web formed with foot portion at each end of the clip web. The pair of foot portions extend out of the plane of the web for engagement with the support wall outboard surface defining an elongated slotted clearance therewith. The bracket head plate has a rectangular aperture intermediate its ends defining a forward plate portion adapted for captured in the slotted clearance permitting vertical and longitudinal distortion free thermal growth of the plastic panel and clip relative to the bracket and vehicle frame.

6 Claims, 2 Drawing Sheets

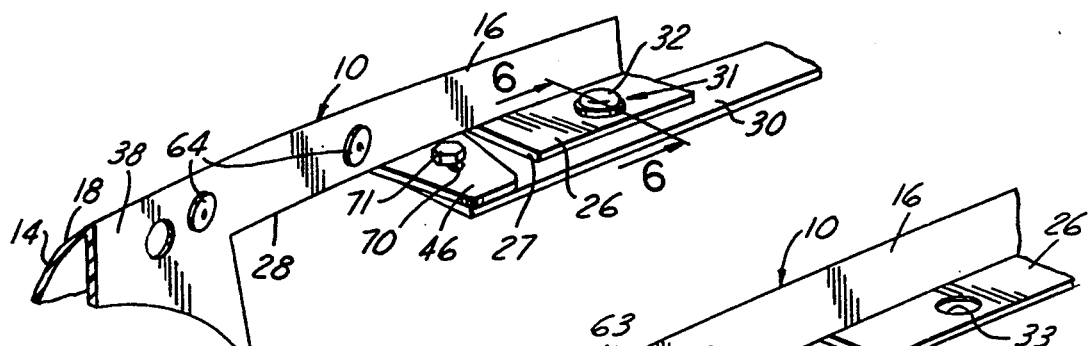
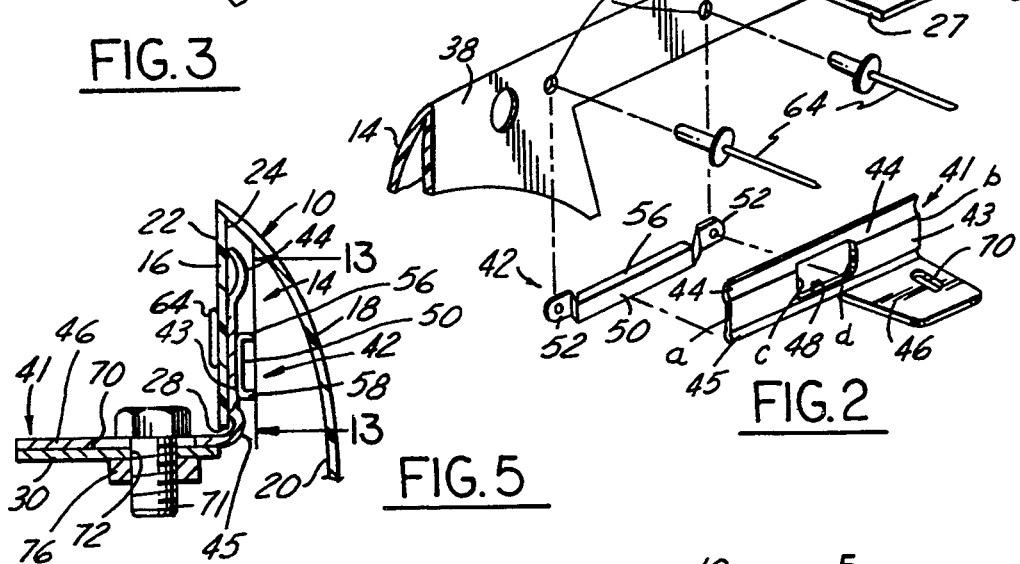
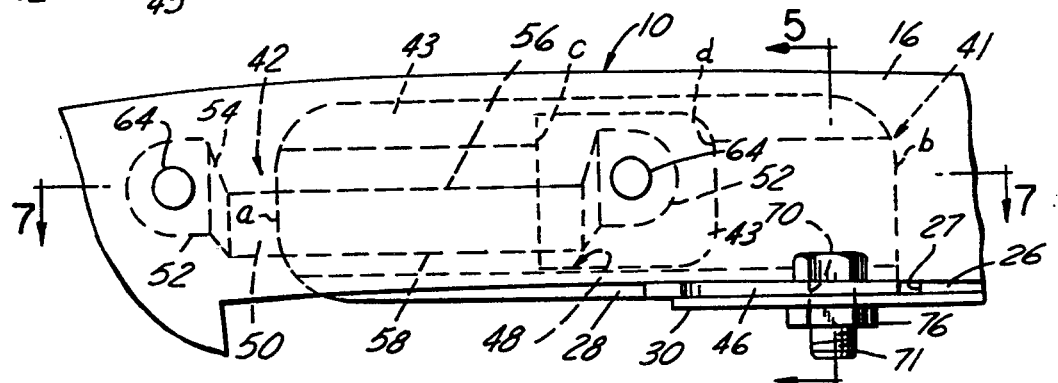
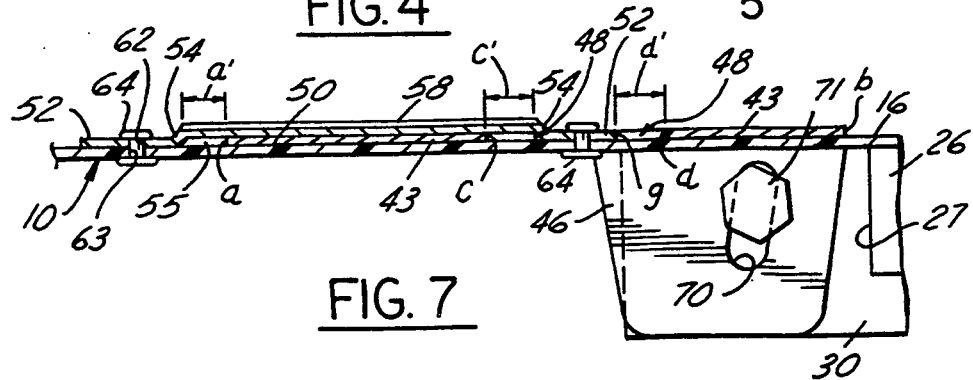

RETAINING ARRANGEMENT FOR FENDER

BACKGROUND OF THE INVENTION

This invention relates to automobile body structures and, more particularly, to an arrangement for retaining a free end portion of vehicle plastic body panel to a subjacent metal portion of the vehicle frame.

Various fastening arrangements have been used to secure flexible elastomeric vehicle body panels to a subjacent connector member. One arrangement for mounting a plastic fender panel is shown and described in U.S. Pat. No. 5,061,108 issued Oct. 29, 1991 to Bien et al. and assigned to the assignee of the present application. The Bien patent discloses one or more female connectors integrally formed on a fender panel engaging associated male connectors projecting from a supporting surface. One of the problems associated with such flexible plastic panel assemblies is to achieve front corner dimensional stability during heat cycling and design service life.

The U.S. Pat. No. 5,098,765 issued Mar. 24, 1992 to Bien, also assigned to the assignee of the present application, discloses another arrangement for attaching a plastic panel to an automotive body metal substructure enabling controlled distortion free thermal expansion and contraction of the panel relative to the vehicle frame. The '765 Bien patent concerns a plurality of self-adjusting plastic mounting blocks sized for initial insertion in a wide slot portion of an associated keyhole shaped expansion and contraction slot provided in the vehicle metal frame. The blocks are uniquely designed to enable the plastic panel and the blocks to slid relative to the metal frame thereby accommodating thermal movement of the panel.

The U.S. Pat. No. 4,573,733 issued Mar. 4, 1986 to Zaydel discloses an apparatus for mounting a vehicle plastic body panel upon an underlying metal substructure wherein one end of the panel is fixedly mounted on the substructure. The thermal growth of the panel induces longitudinal movement of a mounting member to permit distortion-free growth relative to the underlying metal substructure.

SUMMARY OF THE INVENTION

It is an object of the present invention to provide a clip and bracket fastening arrangement for ready mounting on a vehicle frame substructure enabling dimensional tolerance adjustment of the panel prior to final tightening insuring a satisfactory exterior appearance and thereafter accommodating thermal growth of the plastic panel relative to the substructure.

It is another object of the present invention to provide a panel clip and vehicle substructure bracket adjustable fastening arrangement for plastic fender panels as set forth above enabling inboard adjustment of a cantilevered end portion of a fender panel requiring a minimum of attaching hardware.

It is still another object of the present invention to provide a clip and bracket fastening arrangement for vehicle plastic body panels as set forth above wherein the clip adjustably supports and bracket on the panel as an off-line sub-assembly for subsequent conveyance thereof to a vehicle assembly line for ready three dimensional adjustable attachment to a vehicle body substructure.

BRIEF DESCRIPTION OF THE DRAWINGS

These and other objects, features and advantages of the invention will appear from the following written description and the accompanying drawings in which:

FIG. 2 is a fragmentary exploded perspective view of a fender integral support panel and the fastening arrangement of the present invention;

FIG. 3 is a fragmentary perspective view of the interior vertical surface of the fender support panel with the fastening arrangement secured thereto;

FIG. 4 is a fragmentary side view looking outboard showing the fender support wall secured to the vehicle substructure by means of the fastening arrangement of the present invention;

FIG. 5 is a fragmentary vertical sectional view taken on the line 5—5 of FIG. 4;

FIG. 7 is a fragmentary horizontal sectional view taken on the line 7—7 of FIG. 4;

DETAILED DESCRIPTION OF THE INVENTION

Figure 1:
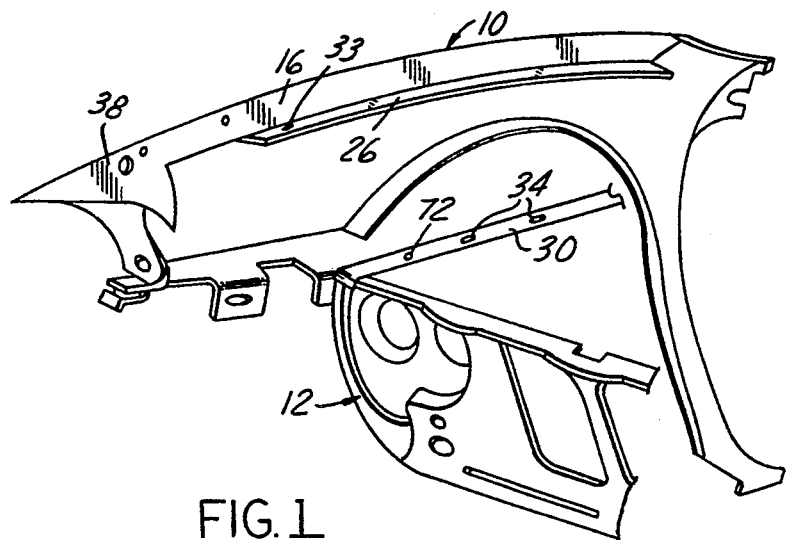
FIG. 1 is a fragmentary perspective view of a vehicle front fender and the vehicle body structure to which the fender is secured.

Referring now to the drawings and in particular to FIG. 1, there is shown a perspective view of a vehicle body fascia panel component, such as a fender, generally indicated at 10, adapted for mounting on a vehicle substructure metal frame 12. In the preferred embodiment, the fascia panel component right hand fender 10 is formed of elastomeric or composite plastic sheet material. Reference may be made to the above mentioned '108 and '765 patents for a detailed description of existing means for attaching a plastic fender to a vehicle.

As seen in FIGS. 1 and 2, the fender panel 10 comprises an exterior fascia panel portion 14 and a vertically disposed inboard planer support wall portion 16. It will be noted in FIG. 5 that the fascia panel portion 14 has an exterior convex surface 18 and an interior concave surface 20 while the support wall portion 16 has a hidden outboard surface 22 and an inboard surface 24. FIG. 1 shows the fender panel inboard wall portion 16 terminating at its lower end in an inboard extending horizontal stiffening shelf flange 26. The shelf flange 26 has its forward end terminating in a transverse edge 27 defining an under-cut horizontally disposed support wall free edge 28 as seen in FIG. 5. FIG. 3 depicts the shelf flange 26 supporting the fender panel 10 by overlying, in a flush or flatwise manner, an associated longitudinally extending body metal right hand frame rail 30. It will be noted that the fender support wall free edge 28 is spaced a predetermined dimension above the upper horizontal surface of frame rail 30.

Figure 6:
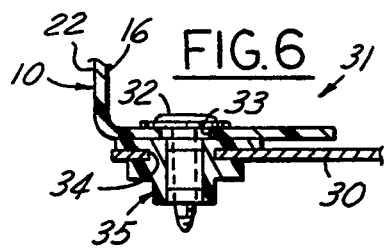
FIG. 6 is a fragmentary vertical sectional view taken on the line 6—6 of FIG. 3.

With reference to FIGS. 3 and 6, there is shown a slidable fastening arrangement 31 comprising a self-tapping threaded screw fastener 32 extending through an oversize fastening hole 33 (FIG. 2) and an associated keyhole-shaped slot 34 (FIG. 1) in the frame rail 30. As seen in FIG. 6, the screw 32 is threaded into a patented plastic nut or block 35 slidably mounted in the keyhole-shaped slot 34. This arrangement allows the plastic fender 10 and its associated blocks 35 to slide fore and aft relative to the frame rail 30 to accommodate longitudinal thermal movement of the fender 10. Reference should be made to the above mentioned '765 Bien patent, the disclosure of which is incorporated by reference herein, for a detailed description of the keyhole-shaped slot 34 and the mounting block 35.

Figure 11:
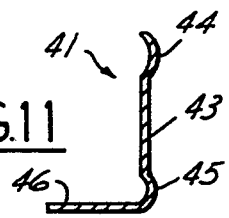
FIG. 11 is a vertical section taken on the line 11—11 of FIG. 10.

The panel retaining arrangement of the present invention uniquely provides three degrees of adjustability of forward cantilevered portion 38 of the fender panel; i.e., transverse, longitudinal and vertical, The retainer arrangement comprises a one-piece L-section angle bracket 41 and a U-shaped retaining clip 42 wherein each are fabricated from sheet metal. As best seen in FIG. 11, the angle bracket 41 is formed with a vertically upstanding head plate 43 bordered along its upper edge by an upper stiffening rib 44 and bordered along its lower terminus by a lower stiffening rib 45. The bracket is asymmetrical in that an aft portion of its lower stiffening rib 45 terminates in an inboard extending horizontal base plate 46. It will be appreciated in FIGS. 4 and 5 that the angle bracket 41 is a "handed" part in that it requires a right hand bracket member 41 be used in conjunction with the right hand fender panel 10. A left hand bracket (not shown), which is a mirror image of bracket 41, is provided for a left hand fender panel (not shown). It will be noted in FIG. 4 that the elongated head plate 43 terminates at a vertical forward terminal edge "a" and a vertical aft terminal edge "b".

Figure 10:
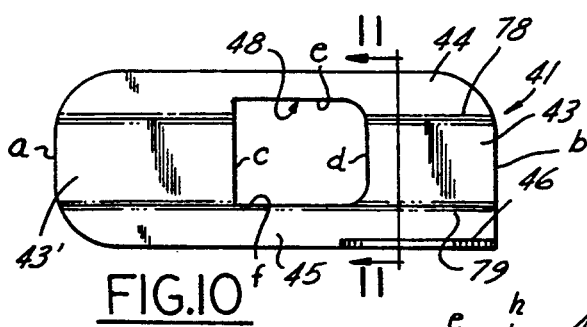
FIG. 10 is an enlarged detail side view of the bracket taken in the direction of arrow "FIG. 10" in FIG. 12.

The base plate 46 is adapted for adjustable lateral support when flush mounted on the upper surface of the right hand frame rail 30. FIGS. 2 and 10 show the elongated head plate 43 formed with a generally rectangular aperture 48 adjacent its longitudinal midpoint for a purpose to be explained. As seen in FIGS. 4 and 7, the aperture 48 has a vertical forward internal edge "c" and a vertical aft internal edge "d".

Figure 9:
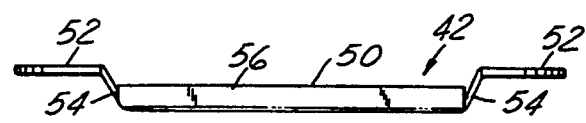
FIG. 9 is a detail top view of the panel strap member of FIG. 8.

As seen in FIG. 9, the retaining clip 42 is generally U-shaped when viewed from above comprising an elongated vertically disposed flat web portion 50 terminating at each end in a mounting foot portion 52. The pair of mirror image feet 52 are off-set inboard from the plane of the web 50 by associated legs 54 bent inboard from the web 50. Upon the clip 42 being mounted on the support wall 16, the web defines an elongated slotted passage 55 (FIG. 7) having a predetermined width slightly greater than the thickness of the bracket head plate 43 providing for longitudinal slidable travel relative thereto. As seen in FIG. 5, the web 50 is channel shaped in vertical section defining upper 56 and lower 58 outboard extending horizontal flanges.

Figure 12:
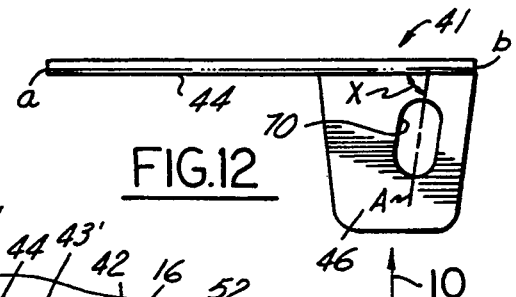
FIG. 12 is an enlarged detail top view of the bracket of FIG. 10.

The L-section bracket 41 has its base plate 46 provided with an elongated adjustment slot 70 extending therethrough. It will be noted in FIG. 12 that the slot principal axis "A" intersects the head plate 43 at an acute angel "X" from the longitudinal. In the disclosed embodiment, the angle "X" is of the order of eighty degrees from the longitudinal axis of the head plate. A bolt 71 is adapted for reception in the bracket slot 70 and in an aligned hole 72 (FIG. 1) in the vehicle frame rail 30 providing a selectively adjustable connection between the bracket 41 and the vehicle frame 12.

After the fender panel is secured on the rail 30 by the attaching arrangements 31, but prior to final tightening of the nut 76 on the bolt 71, the leading portion 38 of the fender panel 10 is urged inboard relative to the body to its designed position. Thereafter the nut 76 is threaded on the bolt 71 and torqued down to positively secure the bracket 41 to the frame rail horizontal surface. It will be noted that the slot 70 is angled slightly from the normal to allow the forward portion 38 of the fender panel to conform to the streamlined design of the body forward end.

The fender panel 10 is adapted for ready assembly line installation by attaching the panel shelf flange 26 to the frame rail 30 by a plurality of the longitudinally slidable attaching arrangements 31. Thereafter, the bracket 41 and clip 42 adjustable fastening arrangement adjustably secures the cantilevered forward portion of the fender panel to its designed inboard location relative to the body.

Figure 13:
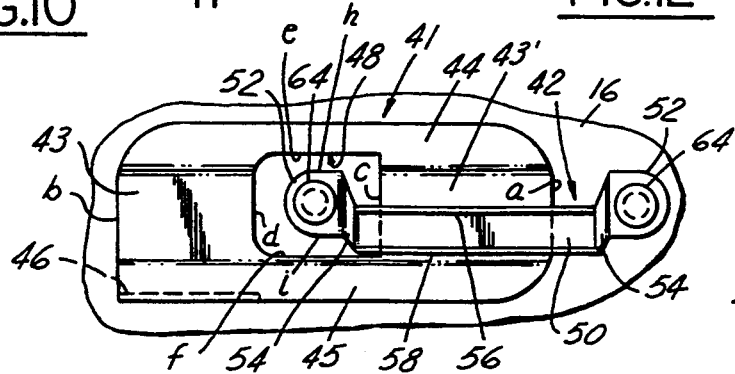
FIG. 13 is a fragmentary side view taken on the line 13—13 of FIG. 5.

With reference to FIGS. 5 and 7, it will be seen that applicants' novel bracket and clip assembly 40 and 41 is adapted for installation on the fender panel support wall 16 prior to its being mounted on the vehicle body during an assembly line operation. Thus, with the bracket head plate 43 located in flush flatwise contact with the panel wall outboard surface 22 the clip web 50 is positioned in overlying relation thereto such that the clip aft foot 52 is substantially centered in the aperture 48 (FIG. 13) with each foot mounting hole 62 aligned with an associated fastener hole 63 (FIG. 2) in the wall 16. It will be noted in FIG. 13 that the clip web 50 overlies a forward portion 43' of the bracket head plate 43 defined by head plate vertical forward exterior edge "a" and vertical forward internal edge "c" of the aperture 48. Thus as seen in FIG. 7, upon the pair of rivets 64 being inserted and secured in their associated fastener holes 63 the bracket head plate forward portion 43' is captured in the clip slotted clearance 55 allowing shipment of the fender panel together with the pre-assembled bracket 41 and clip 42. It will be noted that the aperture 48 is further defined by aft vertical internal edge "d" together with upper horizontal internal edge "e" and lower horizontal internal edge "f".

With reference to FIGS. 4, 5, and 11, it will be noted that the head plate 44 has formed in one inboard side thereof a pair of upper 44 and lower 45 outboard facing horizontally extending stiffening ribs coextensive with the head plate. It will be seen that the ribs 78 and 79 are concavely indented on the head plate inboard surface providing flush contact with support wall surface 24 while the ribs convexly protrude from the head plate outboard side.

The installation sequence for the fender panel 10 involves initially securing the fender panel shelf flange 26 in a flatwise slidable manner on the upper surface of the frame rail 30 by suitable fastening means such as the attaching arrangement shown at 31 in FIG. 6. Thereafter a bolt 71 is inserted through the bracket base plate slot 70 and an aligned hole 72 (FIG. 72) in the frame rail 30 and retained for inboard and outboard adjustment prior to final tightening of the nut 76. It will be appreciated that the fender panel support wall and clip 42 are free for limited longitudinal and vertical adjustment relative to the bracket head plate and the vehicle frame. This allows the installer to flex the forward-most cantilevered portion 30 of the fender 10 inboard to its predetermined design position relative to the vehicle body panel (not shown) prior to tightening the nut 76.

With reference to FIG. 7, it will be seen that with the clip and bracket retaining arrangement are shown secured in their neutral temperature position prior to any thermal growth of the fender panel. In this mode the bracket aperture forward internal edge "c" is spaced a predetermined dimension "c'" from the clip aft leg 54 while the aperture 48 internal aft edge "d" is spaced a predetermined dimension "d'" from the clip aft foot opposed edge 52. It will be noted that the dimensions "c'", and "d'" are substantially equal and permit distortion-free longitudinal growth or adjustment of the fender panel 10 and the clip 42 relative to the bracket 41 and the vehicle frame.

It will be appreciated that the centered position of the clip aft foot 52 allows vertical adjustment of the fender panel and clip reactive to the bracket and vehicle frame. Thus, the clip aft foot upper edge "h" is spaced a predetermined first dimension from the aperture upper internal edge "e" while the clip aft foot lower edge "i" is spaced a predetermined second dimension from the aperture lower internal edge "f". The first and second dimensions are substantially equal permitting distortion free vertical thermal growth of the fender panel relative to the vehicle frame.

Figure 8:
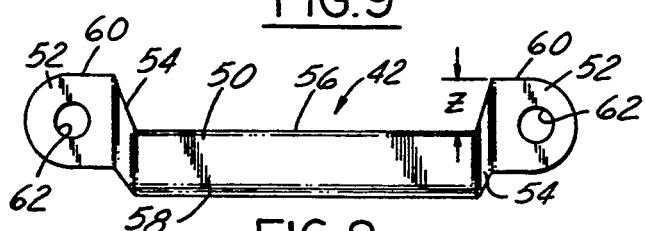
FIG. 8 is detail side view of the panel strap member shown in the fastening arrangement of FIG. 2.

With reference to FIG. 8, it will be seen that the web 50 is offset downwardly a dimension "Z" from the uppermost edges of the foot portions 52. It will be noted in FIG. 5 the internal clearance space between the support wall 16 and the inwardly curving facia fender panel 14 narrows toward their upper juncture. Thus, the downwardly offset web 50 compensates by lowering design position of the head plate relative to the upper juncture.

While the principles of the present invention in connection with the specific test device has been described, it is to be understood the foregoing detailed description has been made by way of example only and not as a limitation to the scope of the invention as set for in the accompanying claims.

What is claimed is:

1. A clip and bracket retainer arrangement for securing a support wall of plastic exterior panel to an automotive vehicle subjacent frame, the support wall defining inboard and outboard surfaces, the panel and frame being constructed of materials having substantially dissimilar rates of thermal expansion, the fastener arrangement allowing the panel member to longitudinally expand and contract relative to the frame for accommodating thermal movement thereof, the fastening arrangement comprising:

a clip formed in a U-shape when viewed in horizontal section having a longitudinally elongated web, the web having one inboard surface positioned in a vertically extending plane offset a predetermined dimension from the support wall outboard surface, said web having a foot portion formed at each opposite end, and fastener means fixedly securing each said foot portion to the support wall outboard surface, whereby said web inboard surface and the support wall outboard surface defining a slotted clearance therebetween having a predetermined longitudinal extent;

an L-section sheet metal bracket comprising a vertically disposed longitudinally elongated head plate having forward and aft vertically extending terminal edges, said head plate formed with a lower inboard extending base plate adjacent said aft terminal edge, said head plate having a generally rectangular-shaped aperture located intermediate said forward and aft terminal edges of a predetermined size defining vertically spaced upper and lower horizontal internal edges and horizontally spaced forward and aft vertical internal edges;

said bracket head plate providing a forward portion defined by said head plate forward terminal edge and said aperture forward vertical internal edge configured and sized for capture in said slotted clearance with said clip aft foot substantially centered within the confines of said bracket head plate aperture, whereby said panel and clip are free for limited fore and aft longitudinal travel together with limited upper and lower vertical travel relative to said bracket and vehicle frame; and adjustable securing means attaching said bracket base plate on the vehicle frame permitting limited inboard and outboard conjoint movement of the base plate and panel relative to the vehicle frame prior to positive positioning of said bracket.

2. The clip and bracket retainer arrangement as set forth in claim 1 wherein said bracket head plate forward portion having a predetermined longitudinal length between its forward terminal edge and said aperture forward internal vertical edge, said head plate forward portion length being a predetermined dimension less than said slotted clearance longitudinal extent.

3. The clip and bracket retainer arrangement as set forth in claim 1 wherein said bracket base plate adjustable securing means a threaded fastener passing through an elongated adjustment slot in said base plate and an aligned hole in the frame permitting, prior to final tightening of the threaded fastener, inboard and outboard adjustable movement of said bracket base plate relative to the vehicle frame.

4. The clip and bracket retainer arrangement as set forth in claim 3 wherein said base plate is supported on a longitudinally extending horizontally disposed metal rail portion of the subjacent frame.

5. The clip and bracket retainer arrangement as set forth in claim 1 wherein said bracket and said clip are each one-piece members formed from sheet metal.

6. The clip and bracket retainer arrangement as set forth in claim 1 wherein said clip web is offset downwardly a predetermined dimension from uppermost edges of said foot portions.

* * * * *